United States Patent
Perella Clark (10) Patent No.: US 11,247,162 B2
(45) Date of Patent: Feb. 15, 2022

(54) DRAINING AND SEALING DEVICE FOR MIST ELIMINATORS

(71) Applicant: NC Engenharia, Indústria e Comércio Ltda., São Paulo-SP (BR)

(72) Inventor: Nelson Perella Clark, São Paulo-SP (BR)

(73) Assignee: NC Engenharia, Indústria e Comércio Ltda., Sao Paulo-SP (BR)

( * ) Notice: Subject to any disclaimer, the term of this patent is extended or adjusted under 35 U.S.C. 154(b) by 0 days.

(21) Appl. No.: 17/044,061

(22) PCT Filed: May 24, 2019

(86) PCT No.: PCT/BR2019/050190
§ 371 (c)(1),
(2) Date: Nov. 19, 2020

(87) PCT Pub. No.: WO2019/227188
PCT Pub. Date: Dec. 5, 2019

(65) Prior Publication Data
US 2021/0069625 A1    Mar. 11, 2021

(30) Foreign Application Priority Data
May 30, 2018 (BR) .................. BR102018011146-9

(51) Int. Cl.
*B01D 46/00* (2006.01)
*B01D 46/24* (2006.01)
*B01D 46/30* (2006.01)

(52) U.S. Cl.
CPC ..... *B01D 46/0031* (2013.01); *B01D 46/0005* (2013.01); *B01D 46/24* (2013.01); *B01D 46/30* (2013.01); *B01D 2271/02* (2013.01)

(58) Field of Classification Search
None
See application file for complete search history.

(56) References Cited

U.S. PATENT DOCUMENTS 2,402,140 A * 6/1946 Heintzelman .......... F24F 3/1411
                                                          55/482
3,540,190 A    11/1970 Brink, Jr.
(Continued)

FOREIGN PATENT DOCUMENTS

BR   10201502512-6 A2   4/2017
JP        H1182886 A     3/1999
WO   WO-2017/080606 A1  5/2017

OTHER PUBLICATIONS

International Searching Authority, International Search Report and Written Opinion for International Application No. PCT/BR2019/050190, dated Jul. 8, 2019, (17 pages), Instituto National Da Propriedade Industrial, Rio de Janeiro/RJ, Brazil.
(Continued)

*Primary Examiner* — Frank M Lawrence, Jr.
*Assistant Examiner* — Phillip Y Shao
(74) *Attorney, Agent, or Firm* — Alston & Bird LLP (57) ABSTRACT

The present patent of invention application refers to a draining and sealing device (1), belonging to the field of forward flow or reverse flow mist eliminators or polygonal plate systems used in various industries, which consist of a tubular body (10) formed by an optional upper portion (11) comprising a cover e having a closed upper end (12) and radial drainage openings (13); an intermediate attachment portion comprising a thread (14) or welding ring (15) or flange (16); and a lower tubular portion (17) provided with a lower end having drainage holes (18); said drainage and sealing device (1) also being formed by a body of drainage and sealing fibers (20) housed in the lower tubular portion (17) that provides drainage of the collected liquid and sealing against the countercurrent circulation of mist-containing gas; said drainage and sealing device (1) may have the tubular body (10) without no upper portion (11).

17 Claims, 8 Drawing Sheets

(56) References Cited

U.S. PATENT DOCUMENTS

| | | | |
|---|---|---|---|
| 4,053,390 A | 10/1977 | James | |
| 4,086,070 A | 4/1978 | Argo et al. | |
| 4,818,257 A * | 4/1989 | Kennedy | B01D 39/2017 |
| | | | 422/161 |
| 4,948,398 A | 8/1990 | Thomaides et al. | |
| 5,605,748 A | 2/1997 | Kennedy et al. | |
| 5,961,678 A * | 10/1999 | Pruette | B01D 46/0005 |
| | | | 55/485 |
| 5,972,171 A * | 10/1999 | Ross | B01D 45/14 |
| | | | 202/158 |
| 5,985,004 A * | 11/1999 | Boyd | B01D 1/305 |
| | | | 55/492 |
| 7,416,576 B2 * | 8/2008 | Ziebold | B01D 46/0031 |
| | | | 55/423 |

OTHER PUBLICATIONS

International Preliminary Examining Authority, International Preliminary Report on Patentability for International Application No. PCT/BR2019/050190, dated May 18, 2020, (28 pages), Institute National Da Propriedade Industrial, Rio de Janeiro/RJ, Brazil.

* cited by examiner

DRAINING AND SEALING DEVICE FOR MIST ELIMINATORS

CROSS REFERENCE TO RELATED APPLICATIONS

This application is a national stage application, filed under 35 U.S.C. § 371, of International Application No. PCT/BR2019/050190, filed May 24, 2019, which international application claims priority to and the benefit of Brazil Application No. BR102018011146-9, filed May 30, 2018; the contents of both of which as are hereby incorporated by reference in their entireties.

BACKGROUND

Technical Field

The present specification refers to an application for a patent of invention for draining and sealing devices belonging to the field of mist eliminators used in various industries, such as in the chemistry field in the manufacture of sulfuric acid, chlorine, soda, plasticizers and the like, which is intended to be a simpler and more efficient design solution that is also simpler and safer to use as compared to the conventional device designed for the same purpose.

Description of Related Art

Mist eliminators are basically tubular beds of polymeric fibers (glass, polypropylene, Teflon, ceramics, carbon, etc.) packed and limited between two concentric or parallel screens and which are arranged so that gases contaminated with mists pass through these beds, the fibers of which capture particles of said mists via different mechanisms, namely: inertial impaction, direct interception and Brownian diffusion. The mists collected in these fiber beds coalesce inside therein and are drained through gravity.

The most typical mist eliminator configurations are as described in patents to Brink (U.S. Pat. No. 3,540,190) and others (U.S. Pat. Nos. 5,605,748; 4,053,390; 4,086,070) and include Forward Flow Filters, Reverse Flow Filters or double elements (U.S. Pat. No. 4,948,398).

Figure 20:
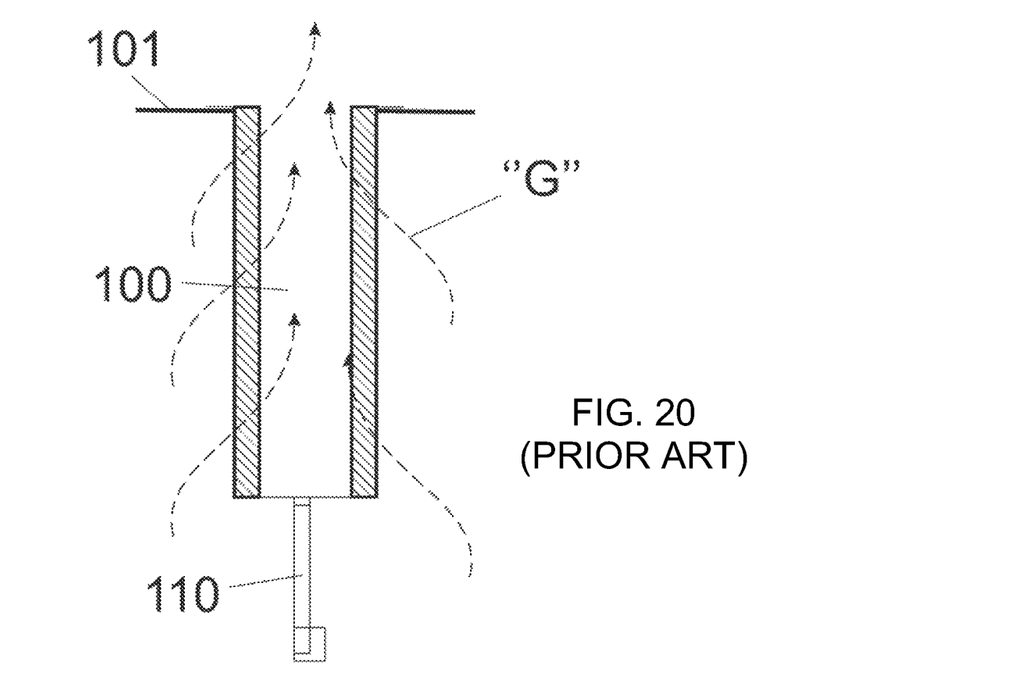
Figure 21:
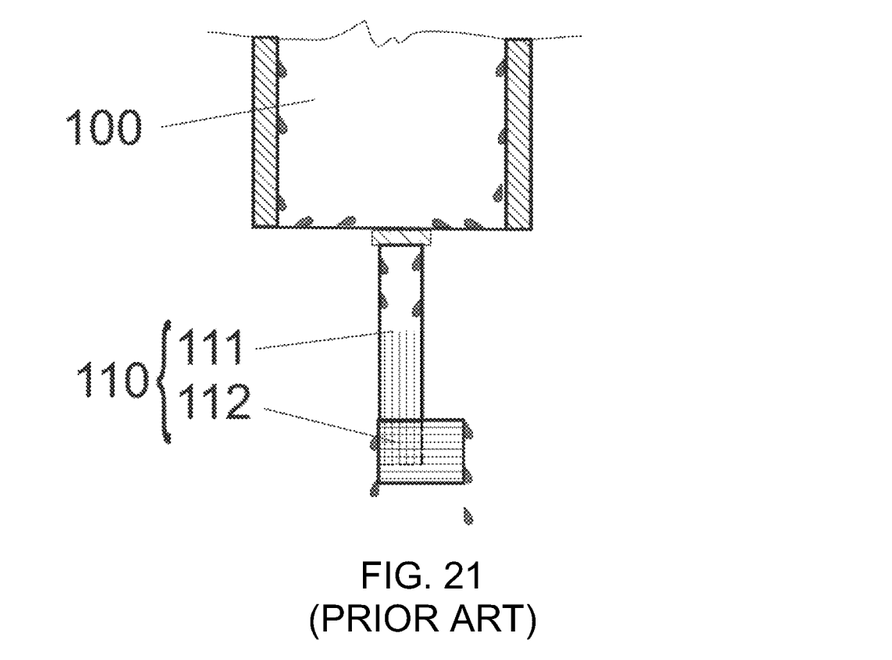

In the former, forward flow mist eliminators (FIGS. 20, 21), mist eliminator filters 100 "hang" under a supporting mirror 101 or flanges; mist-contaminated gases "G" enter the filtering element 100 through the largest (outer) diameter, traverse the fiber bed where mists are collected and coalesced and are exit the filtering element through the smaller (inner) diameter (FIG. 21). Coalesced mists are drained off the downstream face of element 100 by gravity from where they are directed to a hydraulic seal, siphon, 110 and from there they drained back into the process or out of the process vessel.

In reverse flow mist eliminator filter elements (FIGS. 22, 23), said elements 100 "stand" on the flange or attachment mirror 101; mist-contaminated gases "G" enter the element through its smallest (inner) diameter, traverse the fiber bed where mist particles are captured, coalesced, and exit the filtering element through its largest (outer) diameter for the process to continue. Droplets of coalesced mist are drained off by gravity through the filter bed to the flange or supporting mirror 101, where they encounter a sealing and/or draining pipe 110, from which they are drained out of the process vessel or back into the process.

Figure 22:
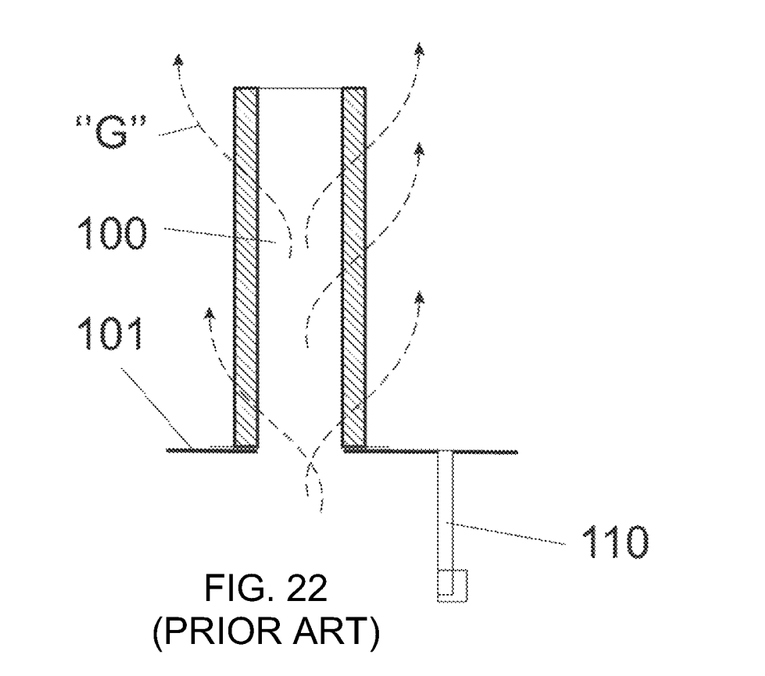
Figure 23:
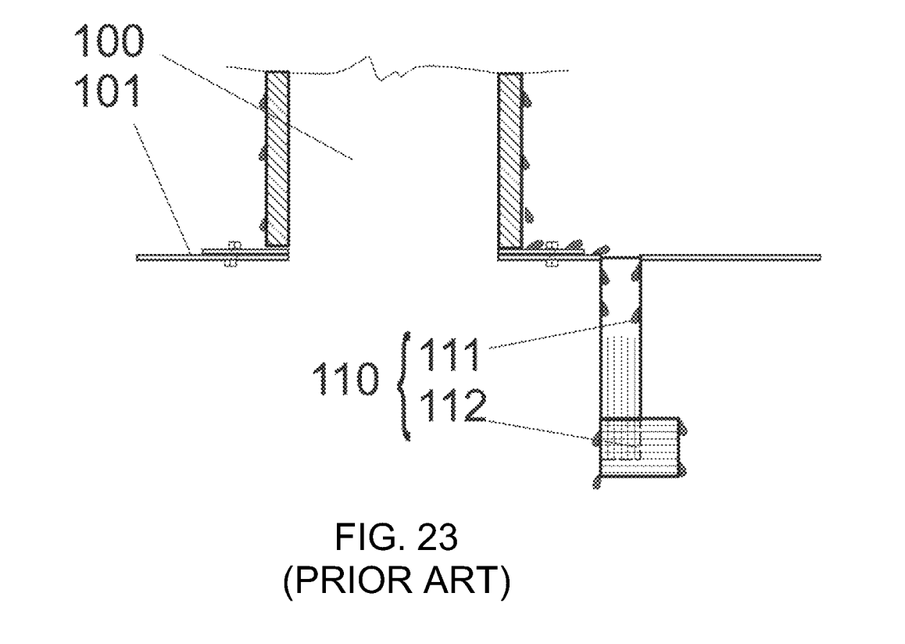

In the prior art (FIGS. 20 to 23), the collected particles are drained off through a pipe/sealing cup assembly 110 mounted on the bottom face of the equipment (FIGS. 20, 21) or in the candle supporting mirror (FIGS. 22, 23). Such pipe/sealing cup assembly 110 is formed by a prolonged opening pipe 111 on the bottom face 101 of the equipment or the candle supporting mirror 101; and a cup 112 into which the pipe 111 enters, the free end of which is near the bottom of the cup, hence forming the siphon system that allows the collection and drainage of collected mist and prevents the gas from passing through. In some instances (not illustrated) the process vessel per se may serve as seal for the collected mists.

The sealing system is required since the high resistance to the passage of gases imposed by the filter bed causes a pressure difference between both sides of the filter. For the collected liquid be drained out of the filtering element or its supporting member, a drainage siphon is required, which comprises the sealing cup 112 and the pipe 111.

However, even though this design works, it has some drawbacks. As such, said sealing siphon 110 must be filled with process fluid. Industrial facilities use dozens, sometimes hundreds of mist-eliminating filters on a tower or equipment, making the sealing operation of the siphon assemblies quite slow, laborious, and sometimes dangerous.

Another problem is the fact that under corrosive media, sealing siphon pipes 110 can be corroded, clogged by the corrosion product, or punctured, leading to failure of the siphon, hence impairing the equipment operation.

The patent to MECS Inc. and patent application BR 10 2015 025126-2 of the same applicant as the present patent application are intended to eliminate conventional sealing systems by using draining systems embedded into the filters themselves; however, there are still thousands of new or in-service equipment using siphon systems and which can benefit from a system that can simplify them.

BRIEF SUMMARY

Thus, a main goal of the present invention is to provide a device for draining and sealing mist eliminators that can overcome the difficulties of usual systems formed by a siphon pipe.

Another object is to provide a device of simple design and that is easy to manufacture.

Another object is to provide a device that can be easily assembled to the receiving equipment and can be used in both existing and yet to be installed equipment as a replacement for siphon sealing devices.

Another object is to provide an equipment of low-cost operation, installation and maintenance.

In view of the difficulties and limitations of the state of the art and in order to overcome them and to meet the aforementioned objects, the device for draining and sealing mist eliminators of the present invention was provided, which is a seal that when threaded, welded and/or flanged to the filtering element or vessel mirror, where siphons would usually be assembled, acts as the latter, preventing gases from entering while favoring drainage of the collected fluid; wherein said seal essentially comprises: a tubular body formed from top to bottom optionally by an upper portion having a closed upper end and radial drainage openings; an intermediate portion for attachment to a surface that is formed by a welding thread or ring or an attachment flange; a lower portion having a lower end provided with drainage holes; said seal further comprising a body made of special draining and sealing fibers housed within said lower tubular body portion, which allows the collected liquid to flow and prevents the passage of gases.

This design of the draining and sealing device overcomes the inconveniences of the usual siphon device, as it eliminates the need for loading siphoning liquid, hence avoiding the issues and danger caused by this operation.

Furthermore, the present device is less subject to corrosion as compared to the usual siphon device, as it can be made of plastics or metals of various natures, thus overcoming the issue seen in the usual siphon device, which features meet the main objects of the invention.

The present device is also of simple construction and manufacture, hence meeting other objects of the invention.

The present device can be used as part of an equipment that is being manufactured or as a replacement for the usual siphon system, thus meeting other objects of the invention.

The present device has low cost of acquisition, installation, operation and maintenance, meeting other objects of the invention

BRIEF DESCRIPTION OF THE FIGURES

The attached figures refer to the device for draining and sealing mist eliminators, that is the object of the present patent, in which:

FIGS. 5 and 6 show a version of the device in which the surface attachment portion is a welding ring; FIG. 5 shows the device with the cover on and FIG. 6 shows the device with no cover;

FIGS. 7 and 8 show a version of the device in which the surface attachment portion is a flange; FIG. 7 shows the device with the cover on and FIG. 8 shows the device with no cover;

FIGS. 11 and 12 show a possible embodiment of the device having a body in a (single-piece) monoblock construction, wherein FIG. 11 shows an embodiment with no cover; and FIG. 12 shows an embodiment with the cover on;

FIGS. 18 and 19 show variants of possible embodiments of the retained mist drainage openings, where FIG. 18 shows circular openings and FIG. 19 shows slit-shaped openings;

FIGS. 20 and 21 are an schematic of the forward flow mist eliminator provided with the conventional siphon draining device that is replaced by the device of the present application, wherein FIG. 11 shows a cutaway view of the mist eliminator and FIG. 12 shows its lower end in detail, on which the conventional siphon draining device is mounted; and FIGS. 22 and 23 shows an schematic of the reverse flow mist eliminator provided with the conventional siphon draining device that is replaced by the device of the present application, wherein FIG. 13 shows a cutaway view of the mist eliminator and FIG. 14 shows its lower end in detail, where the conventional siphon draining device is installed.

DETAILED DESCRIPTION OF VARIOUS EMBODIMENTS

As illustrated in the above figures, the draining and sealing device 1 (FIGS. 1 to 10) of the present application is intended to be used in either a forward flow (FIGS. 20, 21) or a reverse flow (FIGS. 22, 23) mist eliminator 100 acting as a seal that drains the retained liquid and provides a seal against countercurrent circulation of mist-containing gas.

Said draining and sealing device 1 is essentially comprised of a tubular body 10 formed, from top to bottom (FIGS. 1, 2, 3) of: an upper portion 11 comprising a cover for protection against falling debris, said portion 11 being provided with a closed upper end 12 and radial drainage openings 13; an intermediate portion for attachment to a surface of the receiving equipment; said intermediate attachment portion can comprise a thread 14 (FIGS. 1 to 3) or welding ring 15 (FIGS. 5, 6) or attachment flange 16 (FIGS. 7, 8) and a lower tubular portion 17 having a lower end provided with drainage holes 18; said draining and sealing device 1 being formed by a body of draining and sealing fibers 20 housed in the lower tubular portion 17 that provides drainage of the collected liquid and sealing against countercurrent circulation of mist-containing gas.

Optionally, the tubular body 10 may not contain an upper portion 11 comprising a cover for protection against falling debris (FIGS. 4, 6, 8), in which case said tubular body 10 consisting of the draining and sealing device 1 comprises: the tubular portion 17 whose upper end is opened and represents an axial drainage opening 13' and the lower end is provided with drainage holes 18; said body 10 being also formed at the upper end by the threaded type attachment portion 14 (FIGS. 1 to 4) or welding ring 15 (FIG. 6) or flange 16 (FIG. 8) said draining and sealing device 1 being also formed by a body of draining and sealing fibers 20 housed in the tubular portion 17, which provides drainage of the collected liquid and sealing against countercurrent circulation of mist-containing gas.

In detail, the tubular body 10 of the draining and sealing device 1 can be made of several materials, such as metallics, plastics, metals coated with plastics or even ceramics, wherein the closed upper end 12 is formed by a cover; lower openings 18 are provided on a cover. Where the device 1 has a threaded attachment portion 14 a faceted maneuvering band is provided next to the thread.

The choice of materials as well as the fibers used will depend on the individual characteristics of each process.

Fibers comprising the draining and sealing fiber body 20 can be of various natures, materials, diameters and geometries (either woven or not). They are packed to ensure proper drainage without preventing the contaminated gas from passing through the filter beds.

Figure 1:
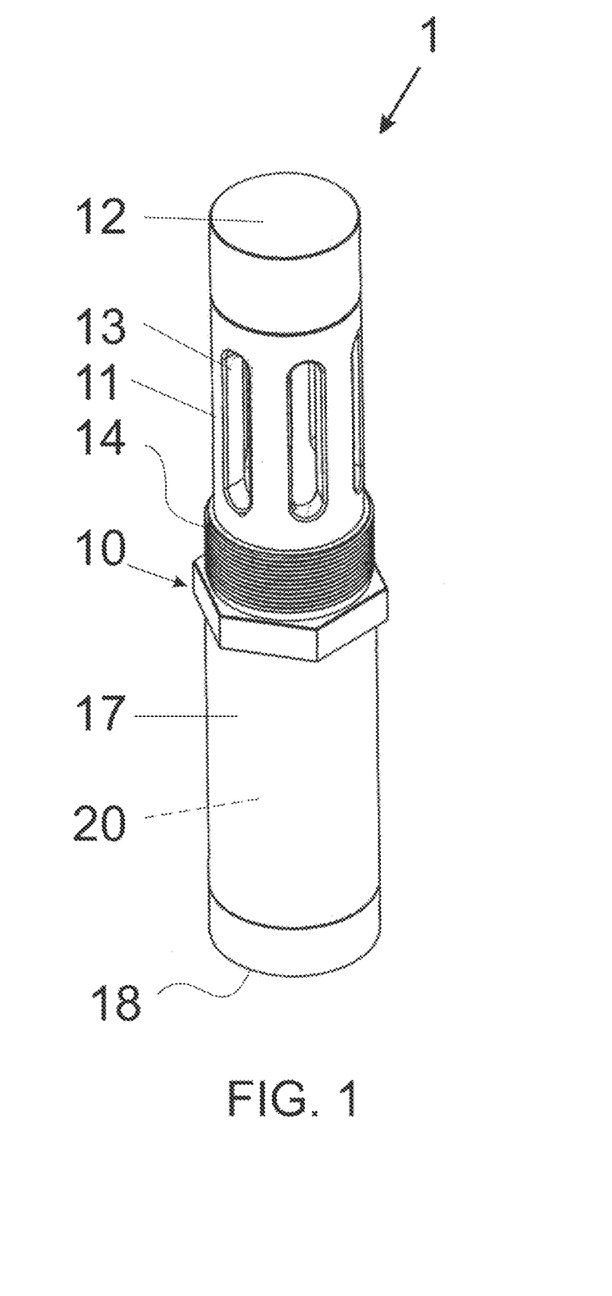
FIGS. 1, 2 and 3 show the device in perspective, front and cutaway views, respectively, in a possible embodiment in which the receiving surface attachment portion is a threaded portion.
Figure 2:
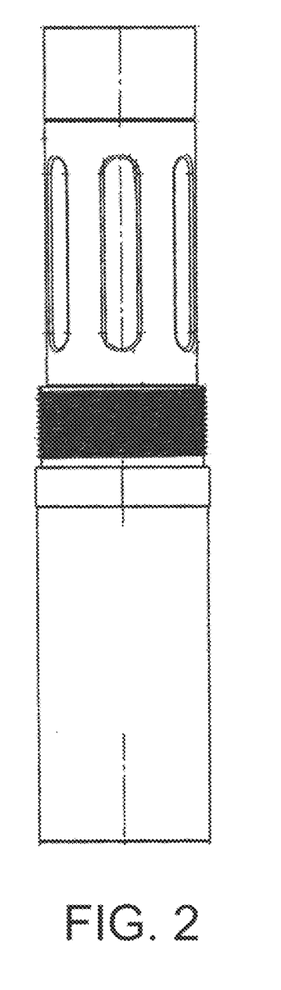
Figure 3:
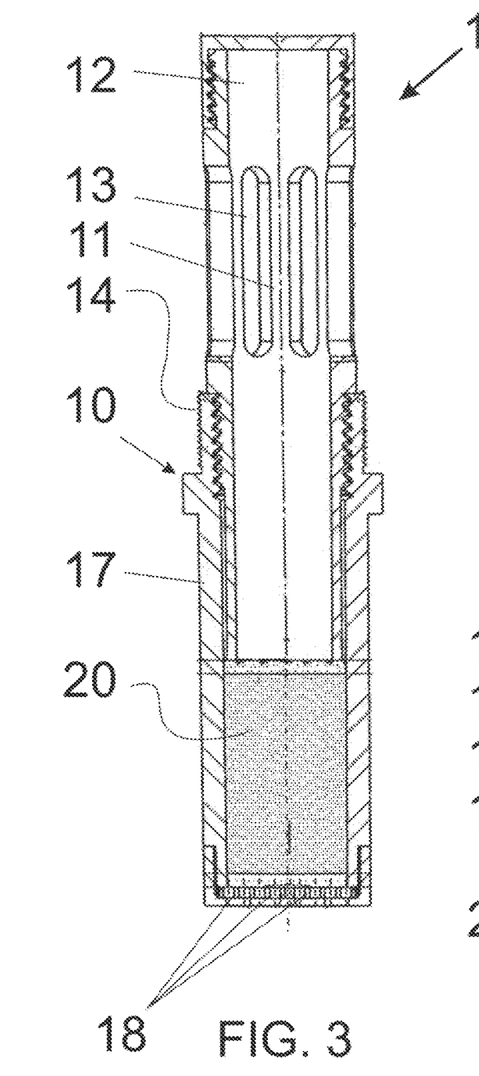
Figure 4:
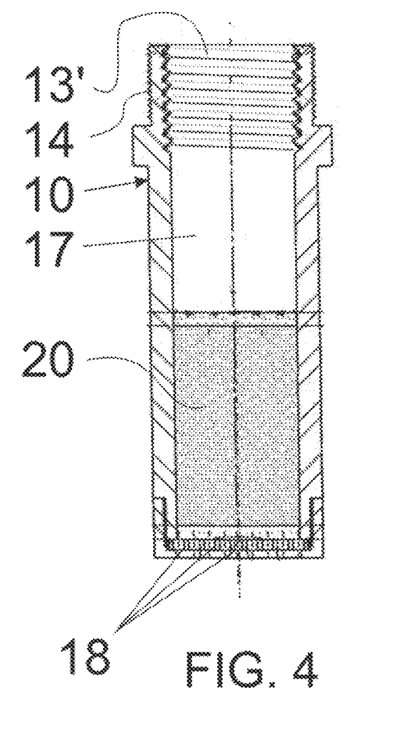
FIG. 4 shows the device without the cover for protection against falling debris.
Figure 5:
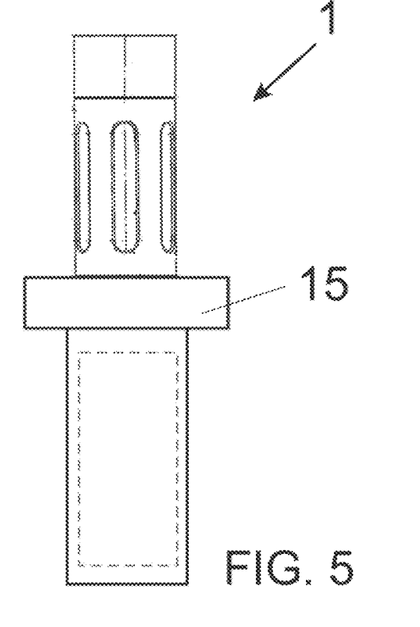
Figure 6:
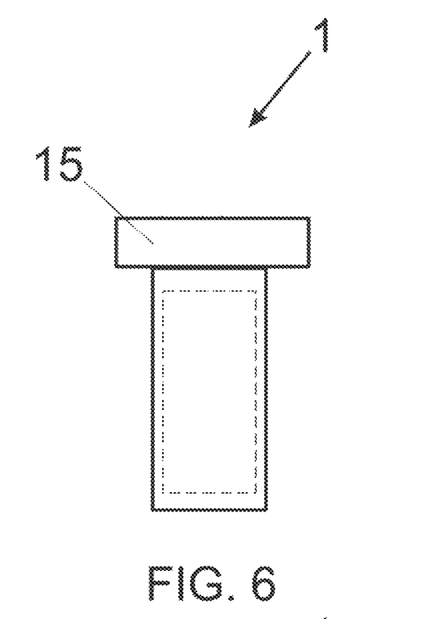
Figure 7:
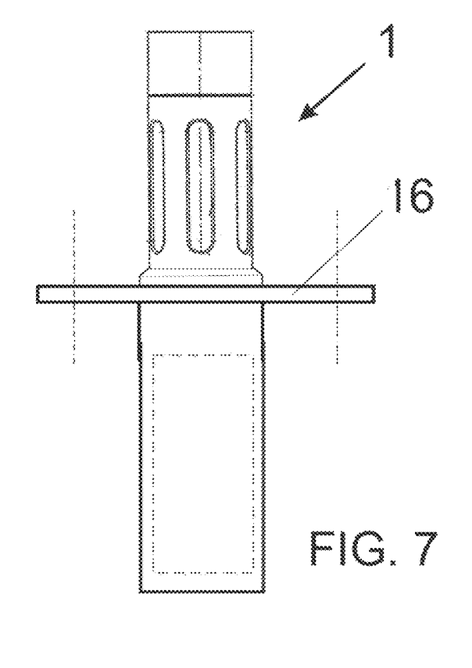
Figure 8:
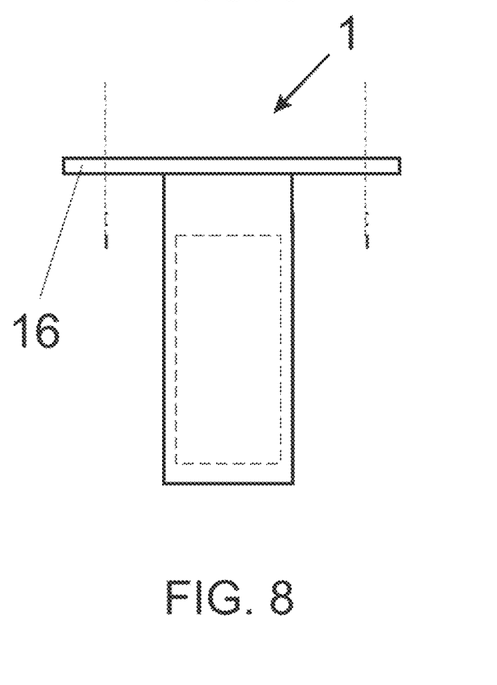
Figure 9:
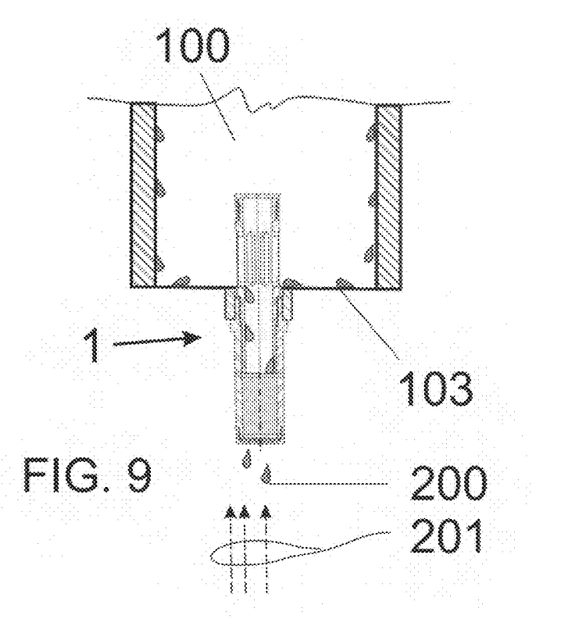
FIG. 9 shows a detail of the device being used in a forward flow mist eliminator.
Figure 10:
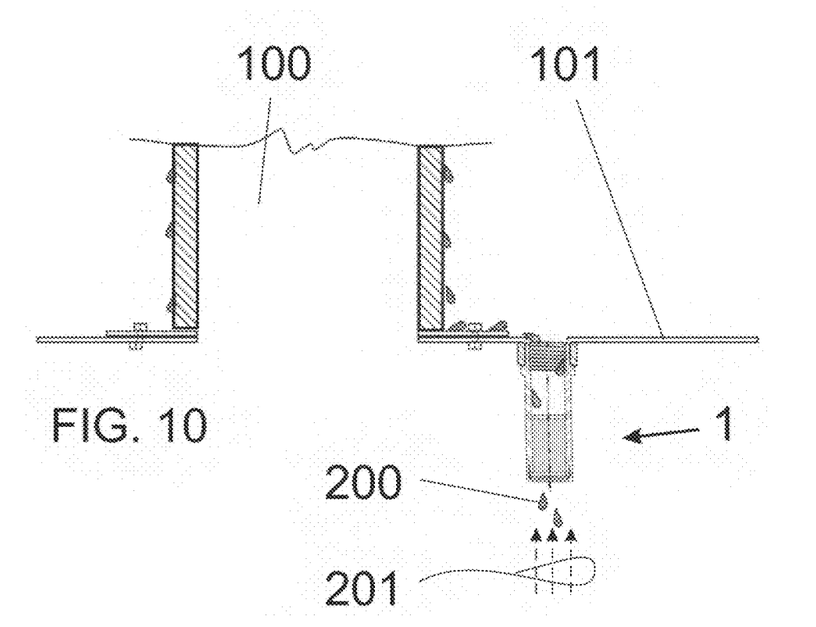
FIG. 10 shows a detail in which the device is being used in a reverse flow mist eliminator.

The draining and sealing device 1, in any of the embodiments, can be attached to the filtering element of the mist eliminator 100 or to the mirror 101 through a thread 14 (FIGS. 3, 4) or weld (FIGS. 5, 6) or flange 16 (FIGS. 7, 8). Size of said draining and sealing device 1 can range from 12.5 mm (½") to 600 mm (24") in diameter and from 25 mm to 2000 mm in height, depending on the process conditions and the expectation of drainage and liquids, viscosity and other parameters.

Thus, where the mist eliminator is a forward flow mist eliminator, the draining and sealing device 1 having the above construction crosses the lower closing end 103 (FIG. 9) of the filtering element 100, where it is attached via a thread 14 or welding ring 15 or flange 16. Under this condition, the retained mist 200 retained by the filter 100 coalesces on the inner surface thereof, flows through the closing end 103, enters the device 1, is drained through its fiber body 20 and either returns to the process or is removed, while said fiber body 20 provides sealing against mist-containing gas 201 that flows in countercurrent to the retained mist 200.

Thus, where the mist eliminator is a forward flow mist eliminator, the draining and sealing device 1 is mounted on the mirror (FIG. 10), in which case the mist 200 retained by the filter 100 flows through the outer surface thereof, flows over the mirror 101, enters the draining and sealing device 1 and is drained through the fiber body 20 that simultaneously prevents the passage of mist-containing gas 201.

In the basic design described above, the draining and sealing device 1 of the present patent may be changed in terms of materials, sizes, functional and ornamental configurations without falling out of the claimed scope of protection.

Figure 11:
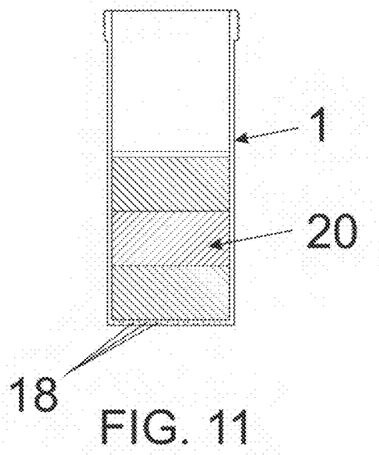
Figure 12:
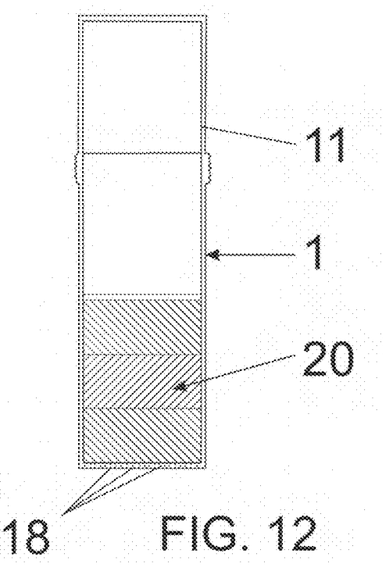

In this regard, the draining and sealing device 1 can be designed with parts mounted to each other, as shown in FIGS. 1 to 4 or optionally they may have a single-piece monoblock body, as illustrated in FIGS. 11 and 12, which show embodiments of the device without and with a cover 11, respectively; said body also housing a fiber body 20 and having openings for draining the retained mist 18.

Figure 13:
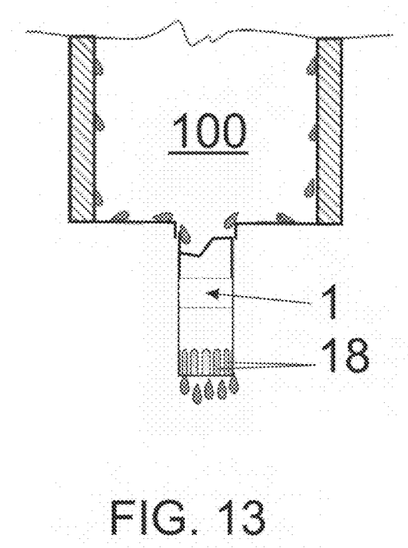
FIG. 13 shows an embodiment of the device with drainage openings for the retained mist arranged laterally.

The draining and sealing device 1 may have retained mist drainage openings 18 arranged on the lower face thereof, as described and illustrated above, or arranged laterally, as shown in FIG. 13.

Figure 14:
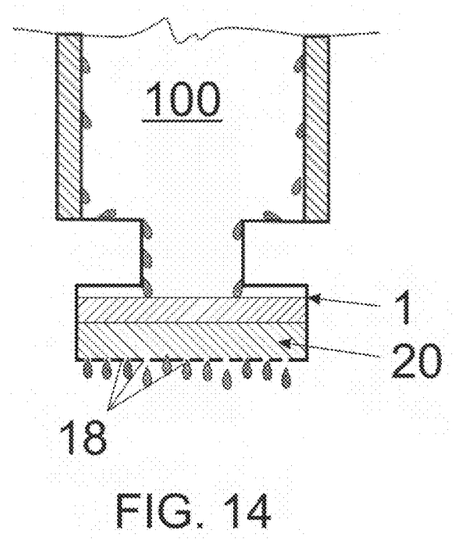
FIG. 14 shows an embodiment of the device having a diameter that is greater than the outlet of the reverse flow mist eliminator; said device having drainage openings for the retained mist arranged on the lower face thereof.
Figure 15:
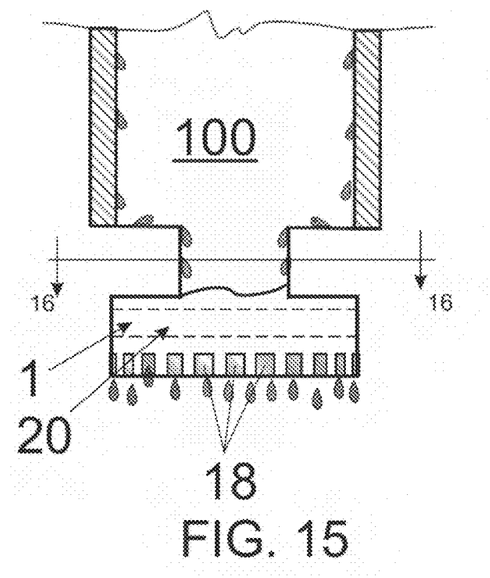
FIG. 15 shows the same device as the previous figure but with drainage openings for retained mist arranged laterally.
Figure 16:
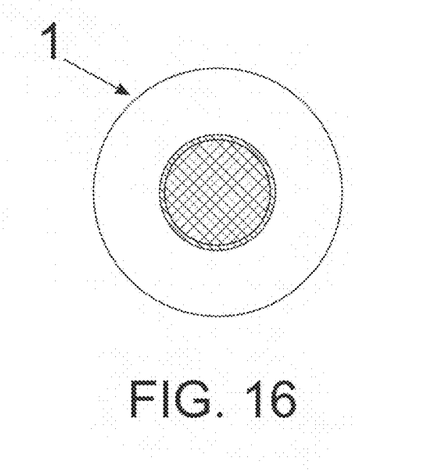
FIG. 16 shows an schematic cutaway illustration of the previous figure showing the device with a circular outline.
Figure 17:
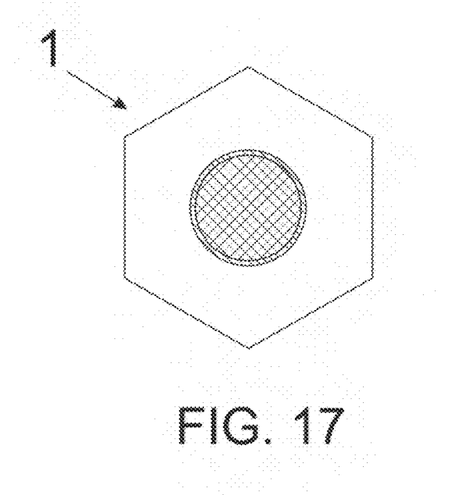
FIG. 17 shows the same figure as the previous one, but showing a device with a polygonal, namely, hexagonal outline.

The draining and sealing device 1 may have smaller diameter than the outlet of the forward flow fiber filtering body 100, as described and illustrated above, or it may have greater diameter, as illustrated in FIG. 14 and be provided with lower (FIG. 14) or side (FIG. 15) drainage openings 18, as well as a circular (FIG. 16) or polygonal (FIG. 17) outline.

Figure 18:
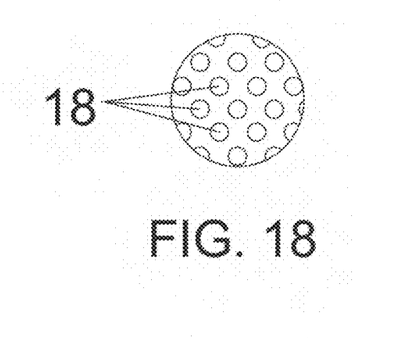
Figure 19:
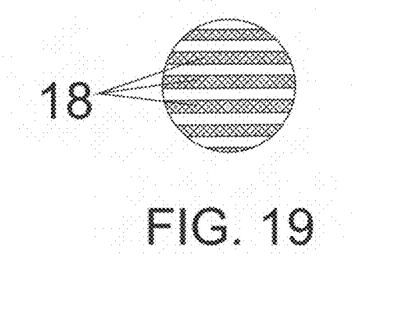

Drainage openings 18 can be circular (FIG. 18) or slit-shaped (FIG. 19).

The invention claimed is:

1. A draining and sealing device in a forward-flow or reverse-flow type mist eliminator, the draining and sealing device comprising:
   a fiber filtering tubular body housed between two concentric or parallel screens of the forward-flow or reverse-flow type mist eliminator, hanging in a flange or thread opening, and comprising:
      an upper portion comprising a cover, having a closed upper end and radial drainage openings;
      an intermediate portion for attachment to a lower closing end of the fiber filtering tubular body or attachment to the flange or thread opening, said intermediate portion comprising a thread; and
      a lower tubular portion having a lower side or lower end of a side face provided with drainage holes; and
   a body of drainage and sealing fibers housed in the lower tubular portion that provides drainage of collected liquid and sealing against countercurrent circulation of mist-containing gas.

2. The draining and sealing device of claim 1, wherein: the lower tubular portion of the fiber filtering tubular body has an opened upper end that constitutes an axial drainage opening and the lower side or lower end of the side face is provided with drainage holes, an upper end of said fiber filtering tubular body being also formed by the thread, and the draining and sealing device is also formed by the body of draining and sealing fibers housed in the lower tubular portion.

3. The draining and sealing device of claim 1, wherein the intermediate portion of the draining and sealing device in the lower closing end of the fiber filtering tubular body or in the flange opening is a welding ring.

4. The draining and sealing device of claim 1, wherein the intermediate portion of the draining and sealing device in the lower closing end of the fiber filtering tubular body or in the flange opening is a flange.

5. The draining and sealing device of claim 1, wherein the draining and sealing device has a body made of parts mounted on each other or a (single-piece) mono-block body.

6. The draining and sealing device of claim 1, wherein the draining and sealing device has a diameter smaller than or greater than a diameter of an outlet of the fiber filtering tubular body and circular or polygonal outline.

7. The draining and sealing device of claim 1, wherein the drainage holes are circular or slit-shaped.

8. The draining and sealing device of claim 2, wherein the intermediate portion of the draining and sealing device in the lower closing end of the fiber filtering tubular body or in the flange opening is a welding ring.

9. The draining and sealing device of claim 2, wherein the intermediate portion of the draining and sealing device in the lower closing end of the fiber filtering tubular body or in the flange opening is a flange.

10. The draining and sealing device of claim 2, wherein the draining and sealing device has a body made of parts mounted on each other or a (single-piece) mono-block body.

11. The draining and sealing device of claim 2, wherein the draining and sealing device has a diameter smaller than or greater than a diameter of an outlet of the fiber filtering tubular body and circular or polygonal outline.

12. The draining and sealing device of claim 2, wherein the drainage holes are circular or slit-shaped.

13. The draining and sealing device of claim 3, wherein one or more of:
   the draining and sealing device has a body made of parts mounted on each other or a (single-piece) mono-block body,
   the draining and sealing device has a diameter smaller than or greater than a diameter of an outlet of the fiber filtering tubular body and circular or polygonal outline, or
   the drainage holes are circular or slit-shaped.

14. The draining and sealing device of claim 4, wherein one or more of:
   the draining and sealing device has a body made of parts mounted on each other or a (single-piece) mono-block body,
   the draining and sealing device has a diameter smaller than or greater than a diameter of an outlet of the fiber filtering tubular body and circular or polygonal outline, or
   the drainage holes are circular or slit-shaped.

15. The draining and sealing device of claim 8, wherein one or more of:

the draining and sealing device has a body made of parts mounted on each other or a (single-piece) mono-block body, the draining and sealing device has a diameter smaller than or greater than a diameter of an outlet of the fiber filtering tubular body and circular or polygonal outline, or the drainage holes are circular or slit-shaped.

16. The draining and sealing device of claim 9, wherein one or more of:

the draining and sealing device has a body made of parts mounted on each other or a (single-piece) mono-block body, the draining and sealing device has a diameter smaller than or greater than a diameter of an outlet of the fiber filtering tubular body and circular or polygonal outline, or the drainage holes are circular or slit-shaped.

17. A system comprising:

a forward-flow or reverse-flow type mist eliminator; and a draining and sealing device comprising:

a fiber filtering tubular body housed between two concentric or parallel screens, hanging in a flange or thread opening, and comprising:

an upper portion comprising a cover, having a closed upper end and radial drainage openings;

an intermediate portion for attachment to a lower closing end of the fiber filtering tubular body or attachment to the flange or thread opening, said intermediate portion comprising a thread; and a lower tubular portion having a lower side or lower end of a side face provided with drainage holes; and a body of drainage and sealing fibers housed in the lower tubular portion that provides drainage of collected liquid and sealing against countercurrent circulation of mist-containing gas.

* * * * *